United States Patent
Geroe et al.

(10) Patent No.: US 10,601,985 B2
(45) Date of Patent: Mar. 24, 2020

(54) METHOD AND SYSTEM FOR MANAGING TELECOMMUNICATIONS

(71) Applicants: Michael Robert Geroe, Carlsbad, CA (US); Michael Gene Perham, Melbourne, FL (US)

(72) Inventors: Michael Robert Geroe, Carlsbad, CA (US); Michael Gene Perham, Melbourne, FL (US)

(*) Notice: Subject to any disclaimer, the term of this patent is extended or adjusted under 35 U.S.C. 154(b) by 0 days.

(21) Appl. No.: 16/168,504

(22) Filed: Oct. 23, 2018

(65) Prior Publication Data

US 2019/0158664 A1  May 23, 2019

Related U.S. Application Data

(62) Division of application No. 15/046,690, filed on Feb. 18, 2016, now Pat. No. 10,142,467.

(60) Provisional application No. 62/273,299, filed on Dec. 30, 2015, provisional application No. 62/118,203, filed on Feb. 19, 2015.

(51) Int. Cl.
*H04M 3/436* (2006.01)
*H04M 3/42* (2006.01)
*H04M 15/10* (2006.01)

(52) U.S. Cl.
CPC ..... *H04M 3/4365* (2013.01); *H04M 3/42042* (2013.01); *H04M 3/42068* (2013.01); *H04M 3/42382* (2013.01); *H04M 15/10* (2013.01)

(58) Field of Classification Search
CPC .......... H04M 3/4365; H04M 3/42042; H04M 3/42068; H04M 3/42382; H04M 15/10
USPC .................................................. 379/201.01
See application file for complete search history.

(56) References Cited

U.S. PATENT DOCUMENTS

| | | | | |
|---|---|---|---|---|
| 5,999,611 | A * | 12/1999 | Tatchell | H04M 3/42204 379/197 |
| 2004/0240642 | A1* | 12/2004 | Crandell | H04L 51/12 379/88.22 |
| 2005/0216341 | A1* | 9/2005 | Agarwal | G06Q 30/02 705/14.64 |
| 2015/0242918 | A1* | 8/2015 | McCarthy | G06Q 30/0617 705/26.43 |

\* cited by examiner

*Primary Examiner* — Quynh H Nguyen

(57) ABSTRACT

Methods and systems are disclosed that allow entities set up and send targeted calls and other communications over a network.

5 Claims, 6 Drawing Sheets

| Name | Contact Details | Consumer Categories |
|---|---|---|
| Telemarketer 1 | Address<br>Telephone<br>Email<br>Passwords | Restaurants<br>    Italian Restaurants<br>    Pizza<br>    Fast Food<br>        Hamburgers |
| Telemarketer 2 | Address<br>... | Sports<br>    Sports Travel<br>    Sporting Goods<br>        Golf Clubs<br>    Skiing |
| Telemarketer 3 | Address<br>... | Insurance<br>    Auto Insurance<br>    Life Insurance<br>    Homeowners Insurance<br>    Renters Insurance |
| Telemarketer n | Address<br>... | ... |

| Name | Contact Details | Price | Interests/Demographics |
|---|---|---|---|
| Consumer 1 | Address<br>Telephone<br>Email<br>Passwords | $2.50 | Food<br>Restaurants<br>Healthy Lifestyle<br>Travel-Europe<br>Female 30-50 City East Coast |
| Consumer 2 | Address<br>... | $2.00 | Food<br>KC Chiefs<br>Motorcycles<br>Restaurants |
| Consumer 3 | Address<br>... | $2.00 | Healthy Cooking<br>Travel<br>Sports Cars-Convertables<br>Male 25-35 Suburban West Coast |
| Consumer n | Address<br>... | $1.00 | ... |

METHOD AND SYSTEM FOR MANAGING TELECOMMUNICATIONS

CROSS-REFERENCES TO RELATED APPLICATIONS

This application is a Divisional application of commonly owned U.S. patent application Ser. No. 15/046,690, entitled: Method and System for Managing Telecommunications, filed on Feb. 18, 2016, now U.S. Pat. No. 10,142,467, which is related to and claims priority from commonly owned US Provisional Patent Applications: Ser. No. 62/273,299, entitled: Method and System for Managing Telecommunications, filed on Dec. 30, 2015, and Ser. No. 62/118,203, entitled: Method and System for Managing Telecommunications, filed on Feb. 19, 2015, all three of the disclosures of the aforementioned patent applications are incorporated by reference in their entirety herein.

TECHNICAL FIELD

The present invention relates to methods and systems for managing telecommunications, in particular, network-based telecommunications.

BACKGROUND

Telemarketing has long been known as a way to directly place advertisers and other information providers into contact with consumers. However, many telemarketer calls are unwanted, nonconsensual, and considered intrusive and annoying by consumers. As a result, legislation was passed in many countries to allow consumers to opt-out of telemarketer calls by being placed on a "do not call" list. Additionally, attempts to target consumers by telemarketers has met with increasing opposition, as many telemarketer calls continue to be random and simply "cold calls."

SUMMARY OF THE INVENTION

The present invention provides a technology platform where consumers are empowered to better control the process of accepting or denying calls made by telemarketers, along with other modes of network-based communication, such as text messages, for the purpose of selling or marketing products, services, and ideas to the general public via a 'controlled' experience, such as a phone call connection. A controlled phone connection, for example, provides the telemarketing company with an opportunity to directly address consumers interested in the goods, services and/or information provided by the telemarketer, and having telemarketing calls answered by a pre-qualified audience of consumers. Whether the 'controlled' experience is in the context of a phone call or a text message, it is a consumer-driven environment characterized by transparency and consumer consent and control.

The present invention provides for telemarketing, or information providing, including advertising companies to pay or bid for the right to speak or otherwise communicate with consumers anonymously and for sharing in advance information about the types of goods and services of interest to the consumers. Accordingly, the invention is such that each participating consumer registers one or more of their telephone numbers through the computerized system of the invention, that links to a network, such as the Internet. The computerized system of the invention includes a platform. The platform, for example, functions to reject unregistered, unsolicited callers, for example, based on programs, instructions, rules and policies, to facilitate and connect calls or other network-based communications such as text messages, from registered advertisers, based on the participating consumer's preferences. Each call that is connected or other communication that is made will have a price/cost that will be automatically determined by formula, e.g., the category, time of day, geography, customer, etc., and various algorithms, that will be paid by a pre-registered telemarketer. If a call is not connected, fees will not be charged to the paying telemarketer. If a connection is made between telemarketer and the consumer, a cost will be charged to the telemarketer and the total cost will be determined by formula, which may be a flat price, or a price per minute, some combination thereof, or through some other methodology. The telemarketer will not know the identity or telephone number of the consumer to whom they are connected, unless and until it is revealed by the consumer.

Embodiments of the present invention are directed to a method for managing telecommunications. The method comprises: detecting, by a communication system, a telecommunication from over a communications network, from a calling entity; associating data with the calling entity; selecting a consumer from a plurality of consumers to receive the telephone communication based on a correlation of data associated with the calling entity and data associated with the consumer; determining a first amount associated with the telecommunication for being charged to the calling entity; automatically transmitting the telecommunication from the calling entity over the communications network, to a telecommunication receiving device associated with the selected consumer, such that the consumer is anonymous to calling entity; and, determining whether the telecommunication is chargeable to the calling entity.

Optionally, the method additionally comprises: the communication system including at least one filter and applying at least one filter to the telecommunication to determine whether the telecommunication is to be transmitted to the telecommunication receiving device associated with the selected consumer.

Optionally, the method additionally comprises: determining, by the communication system, whether the calling entity is permitted to communicate by telecommunications with the plurality of consumers through the communication system.

Optionally, the selecting a consumer includes providing a targeting engine to automatically determine the consumer whose telecommunication receiving device is to receive the transmitted telecommunication from the calling entity.

Optionally, the data associated with the calling entity includes data received by the communication system from the calling entity about the calling entity.

Optionally, the data associated with each consumer of the plurality of consumers includes data received by the communication system from each of the consumers about each respective consumer.

Optionally, the communication system includes a computerized platform.

Optionally, the calling entity includes at least one of: a telemarketer, an information provider or an advertiser.

Optionally, the telecommunication includes at least one of voice over internet protocol (VOIP), smartphone calls, short message service (SMS), text messages, telephone calls, digital video or electronic mail.

Optionally, the method additionally comprises: debiting an account of the calling entity by a second amount when it is determined that the telecommunication is chargeable to the calling entity.

Optionally, the second amount is at least the first amount, and the first and second amounts are monetary amounts.

Optionally, when it is determined that the telecommunication is not to be transmitted to the telecommunication receiving device associated with the selected consumer, determining whether a disposable telephone number is associated with the selected consumer, and, should a disposable telephone number be associated with the selected consumer, opening a voice mail box for receiving a communications via the transmitted telecommunication from the calling entity.

Embodiments of the present invention are directed to a method for facilitating electronic contact, for example, electronic communications, between at least one consumer and an information provider. The method comprises: placing, by a computerized platform (platform), an information provider into interactive contact with a consumer via an electronic communication, based on one or more contact parameters associated with the consumer; and, maintaining, by the computerized platform, the anonymity of the consumer during the interactive contact via the electronic communication.

Optionally, the placing the information provider into interactive contact with the consumer includes the computerized platform correlating information associated with the information provider with the one or more contact parameters associated with the consumer.

Optionally, the electronic communication is received by the computerized platform upon being initiated from the information provider.

Optionally, the contact parameters include: the type of electronic communication desired by the consumer, the times when electronic communications may be received by the consumer, the number of electronic contacts over a time period, the subject of information desired from information providers.

Optionally, the computerized platform classifies the consumer into a type of consumer based on information provided to the computerized platform by the consumer.

Optionally, the information associated with the information provider includes one or more of the subject of the information provided by the information provider, and requests for contact with types of consumers.

Optionally, the computerized platform assigns a monetary value to each interactive contact, and designates the monetary value for receipt by the consumer upon completion of the interactive contact.

Optionally, the electronic communication includes at least one of a telephone call, a smartphone call, a voice over internet protocol (VOIP) call, a short message service (SMS) communication, text message, digital video or electronic mail.

Optionally, the information provider includes at least one of an information provider, a telemarketer or an advertiser.

Embodiments of the present invention are directed to a computer usable non-transitory storage medium having a computer program embodied thereon for causing a suitable programmed system to manage electronic communications, by performing the following steps when such program is executed on the system. The steps comprise: placing an information provider into interactive contact with a consumer via an electronic communication, based on one or more contact parameters associated with the consumer; and, maintaining the anonymity of the consumer during the interactive contact via the electronic communication. For example, the contact parameters include: the type of electronic communication desired by the consumer, the times when electronic communications may be received by the consumer, the number of electronic contacts over a time period, the subject of information desired from information providers.

Embodiments of the present invention are directed to a computer system for managing electronic communications. The computer system comprises: a storage medium for storing computer components; and, a computerized processor for executing the computer components. The computer components comprise: a computer module configured for: placing an information provider into interactive contact with a consumer via an electronic communication, based on one or more contact parameters associated with the consumer; and, maintaining the anonymity of the consumer during the interactive contact via the electronic communication. For example, the contact parameters include: the type of electronic communication desired by the consumer, the times when electronic communications may be received by the consumer, the number of electronic contacts over a time period, the subject of information desired from information providers.

Embodiments of the invention are directed to a method for caller identification (ID). The method comprises: setting a code corresponding to a user; associating the code with calls from an entity; and, causing the code to display on a telephone associated with the user when calls are transmitted from the entity.

Optionally, the caller ID method is such that the entity includes a computerized calling platform.

Optionally, the caller ID method is such that the telephone includes: a smartphone, cellular phone or other mobile device.

This document references terms that are used consistently or interchangeably herein. These terms, including variations thereof, are as follows.

The term, "telemarketer," singular and plural, refers to pre-registered (with the system of the invention) businesses on the platform that pay (for example, by bidding) to be connected to and speak with or otherwise communicate with (for example, via text messages) consumers about particular products and/or services, or provide information. There may be conditions where the telemarketer does not have to pay or bid to be connected to and speak with or otherwise communicate with a consumer. For avoidance of doubt, the term "telemarketer" may be any type of advertiser seeking to communicate with a consumer via a network-enabled device, be it a mobile device such as a smart phone, tablet, vehicle, wearable device (e.g., a smart watch) or laptop computer, or a desktop or other digital device such as desktop computer or smart TV.

The term "consumer," singular and plural is, for example, an individual person, or other entity, who pre-registers with the platform, to accept telemarketer calls and who will be paid a fee for speaking to businesses about products and/or services of interest to the individual or entity. The "consumer" is also able to register with the platform to reject unwanted and unsolicited calls from telemarketers. The terms "click", "clicks", "click on", "clicks on", "activates", and "activation", involves the activation of a computer pointing apparatus, such as a device commonly known as a mouse, or a touch, swipe, contact, or the like on a touch screen with or without a stylus, on a location on a computer screen display, including screen displays of tablets, mobile telephones and other mobile devices. The screen displays are activatable, for example, by an activatable icon, that causes an action of the various software and or hardware, including that for executing applications and supporting the computer screen display.

Throughout this document, a "web site" is a related collection of World Wide Web (WWW) files that includes a beginning file or "web page" called a home page, and typically, additional files or "web pages." The term "web site" is used collectively to include "web site" and "web page(s)."

A uniform resource locator (URL) is the unique address for a file, such as a web site or a web page, that is accessible over networks including the Internet.

A "computer" includes machines, computers and computing or computer systems (for example, physically separate locations or devices), servers, computer and computerized devices, processors, processing systems, computing cores (for example, shared devices), and similar systems, workstations, modules and combinations of the aforementioned. The aforementioned "computer" may be in various types, such as a personal computer (e.g., laptop, desktop, tablet computer), or any type of computing device, including mobile devices that can be readily transported from one location to another location (e.g., a smartphone, personal digital assistant (PDA), mobile telephone or cellular telephone, a watch digitally linked to a network such as the Internet, or other wearable technology such as a digital watch, bracelet or wristband (e.g., a Fitbit™ device) or a Bluetooth headset or other networked headset, or a digital entertainment/communications system integrated with or into a home, apartment or office, or a vehicle such as an automobile, boat, airplane, or cycle such as a bicycle or motorcycle.

A server is typically a remote computer or remote computer system, or computer program therein, in accordance with the "computer" defined above, that is accessible over a communications medium, such as a communications network or other computer network, including the Internet. A "server" provides services to, or performs functions for, other computer programs (and their users), in the same or other computers. A server may also include a virtual machine or a software based emulation of a computer.

An "application" or "software application", includes executable software, and optionally, any graphical user interfaces (GUI), through which certain functionalities can be implemented.

A "client" is an application that runs on a computer, workstation or the like and relies on a server to perform some of its operations or functionality.

The terms "n" and "n$^{th}$" are representative of the last member of a series or sequence of members, for example, servers, databases, computers, elements, with the series being definite or indefinite.

Unless otherwise defined herein, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. To the extent of any conflict, the patent specification, including definitions, will control. In addition, the materials, methods and examples are illustrative only and are not intended to be limiting.

BRIEF DESCRIPTION OF THE DRAWINGS

Some embodiments of the present invention are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Attention is now directed to the drawings, where like reference numerals or characters indicate corresponding or like components. In the drawings:

FIGS. 2B and 2C are diagrams of exemplary databases of the architecture of FIG. 2A; and, FIGS. 3A and 3B are a flow diagram of a process in accordance with embodiments of the disclosed subject matter.

DETAILED DESCRIPTION OF THE DRAWINGS

Figure 1:
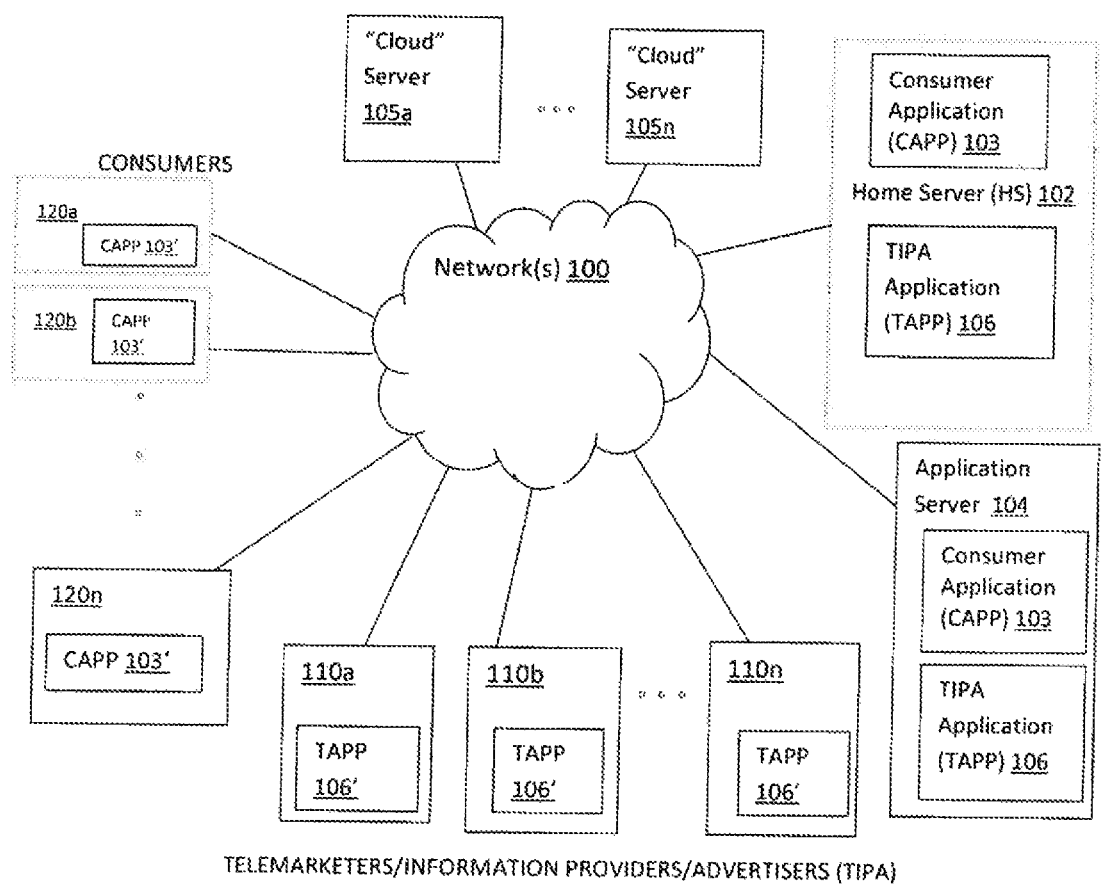
FIG. 1 is a diagram of an exemplary environment for the system in which embodiments of the disclosed subject matter are performed.

Before explaining at least one embodiment of the invention in detail, it is to be understood that the invention is not necessarily limited in its application to the details of construction and the arrangement of the components and/or methods set forth in the following description and/or illustrated in the drawings. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more non-transitory computer readable (storage) medium(s) having computer readable program code embodied thereon.

Throughout this document, numerous textual and graphical references are made to trademarks, and domain names. These trademarks and domain names are the property of their respective owners, and are referenced only for explanation purposes herein.

Reference is now made to FIG. 1, which shows an exemplary operating environment, including a network 100, to which is linked a home server (HS) 102, also known as a main or central server. The home server 102 also defines a system 102', either alone or with other computers, including servers, components, and applications, e.g., client applications, associated with home server 102, as detailed below. The system 102' manages and controls communications between telemarketers/information providers/advertisers (TIPA) 110a-110n (collectively referred to as "telemarketers"), and consumers 120a-120n. Numerous functions of the system 102' may be outside the home server 102, in "the cloud," represented by cloud servers 105a-105n, also linked to the network 100. The cloud servers 105a-105n are typically equipped with hard drives or otherwise facilitate data storage, due to the potentially large amounts of data, or "big data," as handled by the system 102'. The home server 102 may also store one or more applications, such as a consumer application (CAPP) 103, detailed below, accessible by the consumers 120a-120n, for optional download to their smartphones, mobile computers or other mobile devices and the like. The downloaded consumer application is indicated in FIG. 1 as CAPP 103'. Consumers 120a-120n who elect to download the application may find it more convenient to access and use, particularly if they wish to access system 102' while not in front of a desktop computer. The download, however, is purely optional. Further, home server 102 may store a telemarketer/information provider/advertiser (TIPA) application (TAPP) 106, detailed below, accessible by advertisers, telemarketers or information providers 110a-110n who have the option to download the application to their smartphones, mobile computers or other mobile devices and the like. The downloaded telemarketer (TIPA) application is indicated in FIG. 1 as TAPP 106'. Telemarketers who elect to download the application may benefit from access to system 102' even when they are not in front of a desktop computer. Like the consumer application 103, the telemarketer application 106 is purely optional.

The consumer application 103 can also be stored on an application server 104, linked to the network 100. This server 104 makes the application 103 accessible to the consumers 120a-120n, for download to their smartphones, mobile devices and the like. The application 103, once installed and running (executing) on the smartphone, tablet, or other computer of the user may include a graphical user interface (GUI) with display call buttons. These call buttons are linked to both the system 102' as well as individual telemarketers, either directly, or indirectly, through the system 102'. For example, a call button linking the consumer to the system 102', may cause one or more menus to be presented to the consumer, such that the consumer can select either the interest category or subject (e.g., insurance, banking, travel, etc.) or the exact telemarketer he or she wants to call or to receive a call from, and, for example, at a designated time or at the time the call button is pressed by the consumer. Consumer application 103 permits the consumer to select preferences of the manner of contact, such as whether they wish to be called on a particular day and time-frame, or whether they wish to receive text messages or other electronic communications on a particular day and time-frame, or some combination of text messages and phone calls. For example, some consumers may appreciate a text message confirming an appointment from a marketer, while other consumers may only want to receive and send text messages, Short Message Service (SMS), electronic mail (email), digital video, or other forms of electronic communication. Consumer application (CAPP) 103 communicates and coordinates with non-calling electronic communications module (NCECM) 215 to the extent the consumer makes selections for modes of communication other than voice calls. All the consumer-facing features of system 102' are integrated with the consumer application (CAPP) 103, permitting the consumer to change or update their profile, password, name, category interests, calling and communication preferences and the like. Similarly, for example, the consumer may select disposable telephone numbers, enter sweepstakes, review rewards options and make rewards selections, review activity and status reports, and suspend or activate calling or other communications to their account through application (CAPP) 103.

Significantly, at the consumer's election, all communication between the consumer and participating telemarketers may be routed through application (CAPP) 103, to preserve the consumer's privacy and other preferences. Application (CAPP) 103 provides the consumer the option of receiving voice calls via Wi-Fi® through the application itself, instead receiving calls from participating marketers through ringing the consumer's cellular phone number registered with system 102'. Similarly, application (CAPP) 103 provides the consumer the option of receiving electronic messages, including text messages, through application 103 itself, instead of through a third party text messaging application using, for example, SMS technology.

Telemarketer (TIPA) application (TAPP) 106 can also be stored on an application server 104, linked to the network 100. Similar to application (CAPP) 103, server 104 makes the application (TAPP) 106 accessible to the telemarketers or information providers 110a-110n, for download to their smartphones, mobile devices and the like. The application (TAPP) 106, once installed and running (executing) on the smartphone, tablet, or other computer of the user may include a graphical user interface (GUI) with display call buttons. These call buttons are linked to both the system 102' as well as individual consumers, either directly, or indirectly, through the system 102'. For example, a call button linking the telemarketer to the system 102', may cause one or more menus to be presented to the telemarketer, such that the marketer can create a promotional campaign within a specific interest category or subject (e.g., insurance, banking, travel, etc.), including identification of one or more demographic characteristics stored in consumer database 211, of the type of consumer the marketer wishes to reach. The marketer may also fund campaigns, transfer funds between campaigns, and utilize the other accounting and reporting features in accounting module 214, through application 106. Further, the telemarketer may start or continue the marketer's promotional or informational campaigns stored in system 102' through the application (TAPP) 106. In short, all the marketer-facing features of system 102' are integrated with and available to the telemarketer or information provider through the application (TAPP) 106.

The network 100 is, for example, a communications network, such as a Local Area Network (LAN), or a Wide Area Network (WAN), including public networks such as the Internet. As shown in FIG. 1, the network 100, may be a single network, such as the Internet, but is typically a combination of networks and/or multiple networks including, for example, cellular or Bluetooth or other networks. "Linked" as used herein includes both wired or wireless links, either direct or indirect, and placing the computers, including, servers, components and the like, in electronic and/or data communications with each other.

There are also servers 110a-110n representative of entities, such as telemarketers. These servers 110a-110n are linked to the network 100 and are such that they connect to telephones or telephone systems (not shown) of each telemarketer, represented by the respective server 110a-110n. These servers 110a-110n are configured to place telephone calls to the consumers 120a-120n through coordination with the home server (HS) 102 and over the network 100, by protocols including those for voice over internet protocols (VOIP), voice packets, Skype™, Viber™, Tango™, and the like.

While the home server 102, cloud servers 105a-105n, and entity servers 110a-110n are shown, there may be additional servers linked to the network 100, but they are optional and not germane to the operation of the present invention. Also, all of the aforementioned servers 102, 105a-105n, 110a-110n may be single or multiple servers.

Consumers are represented by their telephones, mobile devices, or wearables 120a-120n, that link to the network 100, for all or a part of their communications. The telephones or mobile devices 120a-120n are one of, for example, smart phones, cellular phones, tablets, laptops, personal computers, and/or wearable technology, such as watches, bracelets, headsets, or headwear (for example, Google® Glass®) capable of receiving calls, text messages, SMS messages, email, digital video, or other digital or electronic communications, as well as traditional POTS (plain old telephone system) telephones, where some part of the telephone call from the respective telemarketer, from the respective server 110a-110n, travels over the network 100. Accordingly, this is represented by the consumer telephones or mobile devices 120a-120n being linked to the network 100.

Figure 2A:
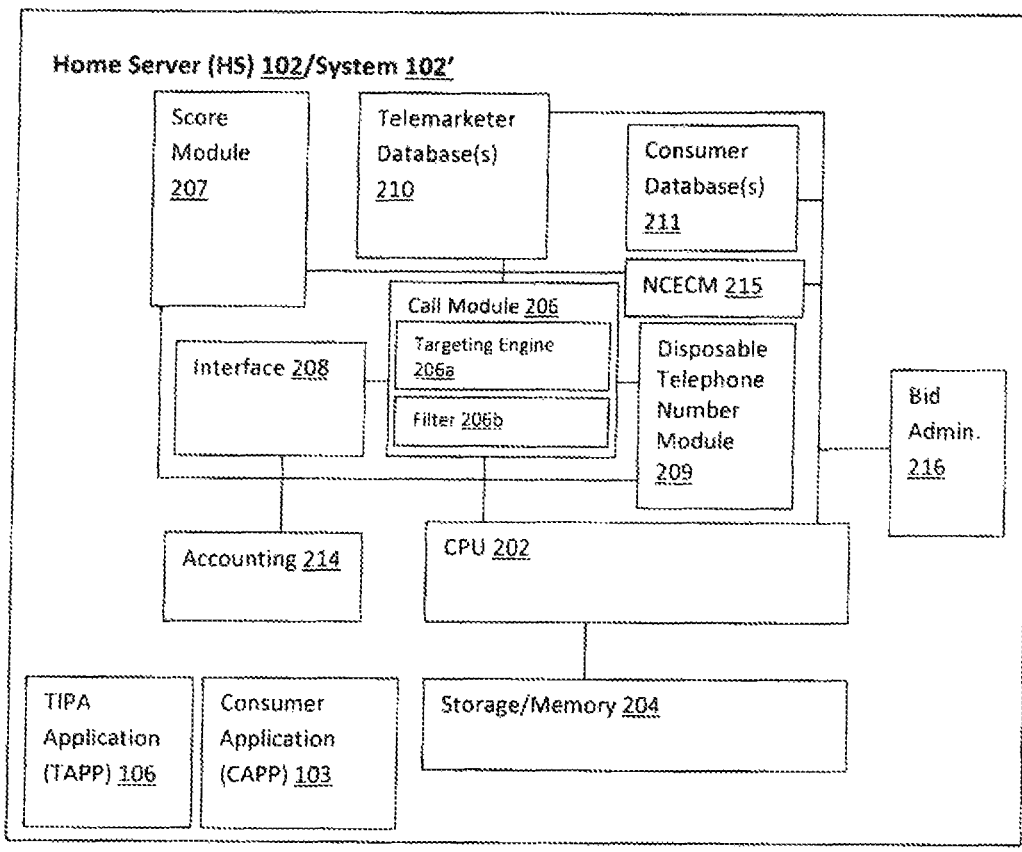
FIG. 2A is a diagram of the architecture of the home server of FIG. 1 and the system thereof.

FIG. 2A shows an architecture for the system 102' of the invention, in, for example, the home server 102. The system 102' operates a platform, and these terms (system 102' and platform) are used interchangeably herein. The platform 102' is, for example, network, e.g., Internet, based, and includes one or more mobile device software applications 103, that facilitate communications, for example, telephone-based calls or other networked communications such as text messages to consumers on behalf of telemarketers that would like to speak or communicate about particular products and services. The platform for example, is computerized (operates as or similar to a computer, as defined above), and also includes modules, engines and other computerized components for managing telemarketer account information; filtering unregistered/unwanted telemarketers by intercepting their calls to telephone numbers registered by consumers with the system 102'. The platform also includes modules, engines and other computerized components for deploying targeting algorithms; automatically connecting each telemarketer soliciting a specific product or service with consumer who previously expressed general interest in such product or service. The platform is programmed with, for example, rules and policies, as well as for administration, for divulging to the telemarketer only as much information about the consumer, as permitted by the consumer. This allows consumers to make choices about adding, updating and managing their preferences about the amount of information, if any, they permit the platform to divulge to telemarketers registered with the platform, as well as the number and mode of calls or other communications they will accept over time. For example, some consumers may prefer to have a text message in advance of a call confirming the date and time of the call or may prefer a text message in lieu of a call or some other combination of calling, text messaging or other communications. The platform also maintains account information for telemarketers and consumers, which may be updated or deleted periodically, or when input from, respectively, the telemarketer, consumer or an administrator of the system 102'.

The architecture includes one or more components, engines, modules and the like, for providing numerous additional server functions and operations, and, for running the processes of the system 102' of the invention, with those that are germane to the invention shown and described below. The home server (HS) 102 may be associated with additional storage, memory, caches and databases, both internal and external thereto. For explanation purposes, the home server (HS) 102 may have a uniform resource locator (URL) of, for example, www.hs.com. The entity servers 110a-110n are such that they map to the homer server 102, so that the system administers and controls the telephone calls made to the consumers 120a-120n, in accordance with the present invention.

The architecture of the system 102' (platform), as shown, for example, in the home server 102, includes a central processing unit (CPU) 202 formed of one or more processors, electronically connected, i.e., either directly or indirectly, including in electronic and/or data communication with storage/memory 204, a call or communications module 206, a score module 207, a network interface 208, a disposable telephone number module 209, storage media, such as databases 210, 211, an accounting module 214, a non-calling electronic communications module (NCECM) 215, and a bid administration module 216. The call module 206, network interface 208, storage media, such as databases 210, 211, accounting module 214, non-calling electronic communications module 215, and bid administration module 216, are also linked to each other, either directly or indirectly, with some linkages noted below.

The Central Processing Unit (CPU) 202 is formed of one or more processors, including microprocessors, for performing the home server 102 and system 102' (platform) functions and operations detailed herein, including controlling the call module 206, the score module 207, interface 208, disposable telephone number module 209, databases 210, 211, accounting module 214, non-calling electronic communications module 215, and bid administration module 216. The processors are, for example, conventional processors, such as those used in servers, computers, and other computerized devices. For example, the processors may include x86 Processors from AMD (Advanced Micro Devices)® and Intel®, Xenon® and Pentium® processors from Intel, as well as any combinations thereof.

The storage/memory 204 is any conventional storage media. The storage/memory 204 stores machine executable instructions for execution by the CPU 202, to perform the processes of the invention. The storage/memory 204 also includes machine executable instructions associated with the operation of the components, including the call module 206, score module 207, interface 208, disposable telephone number module 209, database 210, 211 manipulations, the accounting module 214, the non-calling electronic communications module 215, and bid administration module 216, detailed herein. The storage/memory 204 also, for example, stores rules and policies for the system 102' and the home server 102. The processors of the CPU 202 and the storage/memory 204, although shown as a single component for representative purposes, may be multiple components, and may be outside of the home server 102 and/or the system 102', and linked to the network 100.

The call or communications module 206 is designed to handle communications over the network 100, such as the Internet, cellular networks and the like. The call module 206 includes a targeting engine 206a, which includes instructions, as well as rules and policies, for example, for determining which calls or other communications to make, e.g., which telemarketer to which consumer, by evaluating the databases 210, 211 in real time, establishing the call or other communication between the telemarketer 110a-110n (for example, telemarketers 110a, 110b, 110c and 110n, representing Telemarketer 1, Telemarketer 2, Telemarketer 3 and Telemarketer n, respectively) and the consumer 120a-120n (for example, consumers 120a, 120b, 120c and 120n, representing Consumer 1, Consumer 2, Consumer 3 and Consumer n, respectively), sending (transmitting) the call or other communication out of the system 102' over the network 100 without revealing to the telemarketer the telephone number or identity of the consumer being called, call filtration, and reporting the call and/or completion thereof with the amount associated with the call, to the accounting module 214 (which handles telemarketer account balances and administers credits and payments to the various consumers 120a-120n). The call module 206 also computes the price/cost of each call that will be paid by a pre-registered telemarketer. The price is determined, for example, by a formula, which takes into account parameters such as the category, time of day, geography, customer, types of services (e.g., voice calls, text messaging, specific appointment scheduling, click-to-call), etc., and various proprietary algorithms. The call module 206 includes various targeting algorithms, for example, for automatically connecting each telemarketer soliciting a specific product or service with a consumer who previously expressed general interest in such product or service. The call module 206 is also equipped to deploy these targeting algorithms.

The call module 206 includes one or more filters 206b and call blocking programs. For example, calls are automatically blocked for consumers in the system 102' who have indicated that they do not want any telemarketer calls. The call module 206 also includes one or more "Do Not Call" lists as received from government and non-government organizations, or programs for accessing these lists and checking them, as well as other blocked caller lists such as those compiled from data provided by registered consumers, so as to perform a final check that it is acceptable to call the requisite consumer or to permit a call placed to a registered phone number to freely ring through to the consumer.

The call module 206 also includes one or more filters 206b, such as rules and policies associated with acceptable and approved telemarketers who may use the system 102', and further includes lists of approved telemarketers. The call module 206 can perform comparisons of the telemarketer attempting to initiate a call, to those approved telemarketers on the list, to see if the telemarketer is an approved telemarketer. The call module 206 can also monitor the system 102' to detect calls as having been input or entered into the system 102'. Calls are detected by the call module 206 as either, the telemarketer signals the call module 206 to initiate a call, or the call module 206 intercepts a call placed to a consumer telephone number registered in database 211. The filters 206b in the call module 206 may be hardware, software, or combinations thereof.

The call module 206 also communicates with disposable telephone number module 209. Disposable telephone number module 209 can assign phone numbers to the consumer or permit the consumer to select available numbers in whole or in part. The consumer may provide the telephone number provided by disposable telephone number module 209 in lieu of providing other phone numbers owned by the consumer. The consumer can select preferences associated with the number provided by disposable telephone number module 209, such as whether a call to that number should ring or the manner in which it should ring (e.g., a unique tone or vibration), or whether the call should be immediately redirected to a voicemail box configured by the consumer, which the consumer may check at their convenience. Again, depending upon consumer preferences, the disposable phone number may only be able to receive calls, and may not be used or usable to make outgoing phone calls.

The call module 206 also communicates with a score module 207. This score module 207 places a value on each consumer, of the consumer database 211, for example, by assigning each consumer a score. For example, a telemarketer may have to pay or bid above a baseline amount, or bid or agree to a premium to speak with a high value or high score consumer, the standard amount to speak with a medium value or medium score consumer, or less than a designated amount to speak to a low value or low score consumer. These values and scores are factors which go into determining the price for the call, as determined by the call module 206, as detailed above. For example, the value may be determined by web analytics, looking at a consumer's browsing habits, or other web behaviors, such as the types of products purchased on line. For example, if a consumer views restaurant web sites and downloads coupons or redeems electronic coupons, this consumer is a high value or high score consumer for a telemarketer running a campaign which is associated with restaurant coupons.

Call module 206 uses Caller ID technology to reveal to the consumer called that it is a call from the system 102'. A consumer with Caller ID equipment who is contacted will know before answering the call that the caller is a telemarketer registered with system 102' who will pay to speak with the consumer, and that the telemarketer is offering goods or services of interest, or information to the caller.

The Caller ID technology disclosed herein, is as follows. Conventional consumer Caller ID technology is not easy to customize and modify on demand. The Caller ID of system 102' appears to the consumer as a ten-digit phone number or alpha numeric term or code, selected in whole or in part by the consumer during their registration or at any time via the consumer's account management, for easy recognition; it is stored in Consumer Database 211 (FIGS. 2A and 2C). For example, a consumer born October 11 may select "1011" (as October is the $10^{th}$ month of the year) for the last four digits of a customizable phone number or alpha-numeric code, as part of the caller ID technology permitted through call module 206. The consumer can then recognize a call to their smartphone displaying the selected number, with "1011" as the last four digits in the caller ID, will always be a call from the system 102'. The consumer may easily modify their Caller ID at any time, through their account management portal. By way of further example, the Caller ID may be an alpha numeric code, such as "Optincall-1011," and may further state category specific information, for example, "Optincall Insurance 1011."

The ease with which the consumer may create a unique Caller ID and the ease with which they may change it serves as an important tool to protect the consumer's privacy. Conventional Caller ID technology has been undermined by the ability to manipulate, mask or disguise the accurate identity of the caller. An unscrupulous marketer not registered with system 102' may mask their true identity and utilize a number or name designed to trick and induce the consumer to answer the phone. However, hackers or other unapproved, unregistered or other unwanted users will not easily guess the unique Caller ID of each consumer who registers an account with system 102'. Consumers will have more accurate information, knowing that a caller is properly registered with system 102', when they see their individual and unique Caller ID, while any unrecognized Caller ID may be an unsolicited commercial caller or other unknown and unwanted caller.

The call module 206 also serves to group one or more users by criteria, such as geographic location and time zone. For example, the Kansas City metropolitan area covers two states, Missouri and Kansas, both in the US Central Time Zone. A roofing company may want to conduct telemarketing on Saturday, between 9:00 am and 10:30 am, when people are home, and have agreed to take a call at this time. For example, these recipients have input into the system, e.g., database 211, times when they prefer to be called. The call module 206 would group these recipients for telemarketing by the roofing company.

Staying with the example of the Kansas City metropolitan area, a telemarketer may wish to discuss automobile insurance products. However, since Missouri and Kansas are different states, it may only be pertinent to speak with Missouri residents, as there may be a recent change in Missouri automobile insurance law, which requires new coverage limitations. Accordingly, the call module 206 would group these Missouri recipients for telemarketing by the automobile insurance company.

The call module 206 also interfaces and coordinates with non-calling electronic communications module 215, which functions to transmit text messages and other electronic (but non-voice based) communications associated with cellular telephone, Wi-Fi® and similarly networked services. By sending text messages to a registered phone number, recipients are reminded and alerted in advance, about when they can expect a call from the system 102', based on the earlier preferences they input. The non-calling electronic communications module 215 can check the calendaring and timing of calls scheduled through call module 206, as well as consumer preferences stored in database 211, to determine whether, when, and how to transmit a text or other electronic message to notify a consumer that they will receive a call in the near future.

The text messages transmitted typically include activatable graphics linked to web sites or other networked destinations, such that when touched, "clicked" or otherwise activated, the consumer can confirm that the call-appointment continues to be relevant and convenient, or permitting the consumer to modify or cancel the appointment date, time, or subject category, or be redirected to the web site of an advertiser or content provider, which is rendered to the user's computer browsing application, or a direct phone call over the network 100, to the advertiser or other content provider may be initiated (i.e., a click-to-call implementation). In short, the text messages or other electronic communications can simultaneously serve multiple purposes, ranging from confirming an upcoming call, to initiating an immediate call to an advertiser or a call center, to rescheduling a call, or simply providing a promotional message and/or allowing the consumer to be directed to a website, all depending upon the consumer's preferences, recorded and updated from time to time in database 211. Further, the consumer can respond to the text or other electronic message when convenient to the consumer, in contrast to a ringing phone which by its nature generates a more urgent and immediate call-to-action on the part of the consumer.

The interface module 208 functions to handle all calls and other communications being sent over the network to consumers 120a-120n and received over the network 100 from consumers 120a-120n, and to specify how the system 102' requests, retrieves, and may share data from servers and other computers and the like outside of the system 102', including those linked to the network 100. The interface module 208 also functions to facilitate the interaction of the various software, components, modules, and databases with each other, and also interactions with other servers and the like outside of the system 102', for operation of the disclosed processes.

The databases 210 for telemarketers 110a (Telemarketer 1) to 110n (Telemarketer n) of FIG. 2B, and 211 for consumers 110a (Consumer 1) to 110n (Consumer n), of FIG. 2C, include numerous databases in one or more storage media. The telemarketer database 210 of FIG. 2B includes general information about the telemarketer, its account balance and any specific budgets, as well as a list of promotional campaigns for goods and services, associated with a set of keywords or categories (e.g., travel, insurance, clothing, etc.), and demographic and/or psychographic data important for each respective promotional campaign. Each campaign registered in the database 210 corresponds to a unique code.

The consumer database 211 of FIG. 2C includes information about the consumers, including demographic and/or psychographic information the consumer may voluntarily elect to disclose about themselves (e.g., married or single, homeowner or renter, male or female, etc.), along with an indication of the level of calls or other communications (e.g., text message appointment confirmations and/or offers) they are willing to periodically accept from the system 102' (e.g., none, a few, or many), as well as a list of criteria (keywords, attributes or categories) for which that consumer agrees to accept telemarketer calls and/or other communications such as text messages, the times when they prefer to be contacted, and the products and/or services in which they have an interest. Consumers may, by indicating authorization, allow the system 102' to disclose a consumer's association with an actual product or service. Some consumers may agree to receive promotional text messages in addition to receiving calls; some may only wish to receive text messages confirming or reminding them about calls which will happen in the near future; some consumers may only wish to receive calls and may not want any text messages. Whatever their communications and information disclosure preferences, they are noted via the system's graphical user interface, and stored in the database 211.

Consumers are then contacted in the manner and at the times requested by them. For example, a consumer may have State Farm® automobile insurance, but may be interested in seeking additional information on automobile insurance, including that from State Farm® Insurance, via voice-based calls and/or text messages. Should the consumer authorize the system 102' to disclose this information, an insurance telemarketer would have this information when speaking with the consumer on the telemarketing call, and the telemarketer may adjust its telemarketing strategy accordingly. For example, a State Farm telemarketer may elect not to contact that consumer at all, as they are an existing customer and the State Farm telemarketer may only wish to spend its telemarketing budget on acquiring new customers; or the State Farm telemarketer may desire to spend its telemarketing budget only contacting existing customers in order to sell them additional services; or a telemarketer competing with State Farm may wish to contact that consumer in order to persuade them to switch from State Farm to another brand of insurance; or a telemarketer competing with State Farm may not with to contact that consumer because the consumer already has State Farm auto insurance; or since the consumer authorized promotional text messaging in addition to receiving phone calls, State Farm may decide to only contact the consumer via a text message promotional campaign, which may utilize fewer resources and entail lower costs, than assigning a telemarketer to contact the consumer.

The demographic and/or psychographic information voluntarily disclosed by a particular consumer (e.g., gender, home ownership, car ownership vs. car lease, etc.) may influence the composition and ranking of interest categories presented or displayed to the consumer in the registration process and in the management of their account. Consumers may consequently be presented with a customized selection of categories which are of more interest to them. For example, a consumer indicating that they rent a home may be presented with the category renter's insurance but not the category of home owner's insurance. A consumer who has not indicated whether they own or rent a home may be presented with both of the categories for renter's and home owner's insurance.

Additionally, there are instructions on how the system 102' works, displayed to the consumer via the Platform's 102 website (for example, hosted by the home server 102), in which it is explained that the more information the consumer reveals, the more likely they are to receive relevant calls or other communications (e.g., text messages), and the more calls they accept, the greater the likelihood of being paid more for participation in the program offered through the Platform. If a consumer elects to not disclose demographic or psychographic information and indicates they will not accept any telemarketing calls through the Platform, the consumer will not receive payments (or will not receive as many payments) but will receive the call filtering/call blocking, disposable phone number and other functionality offered by the system 102'.

The bid administration (Admin.) module 216, functions to handle bids of the various telemarketers/information providers/advertisers, who desire to bid on call prices, in order to reach desired consumers. Should the system 102' be opened up to a bidding format, the bid administration module 216 would administer the bidding process, and operate in conjunction with the call module 206, for establishing the call based on the accepted and selected bids of telemarketers/information providers/advertisers.

Figure 3A:
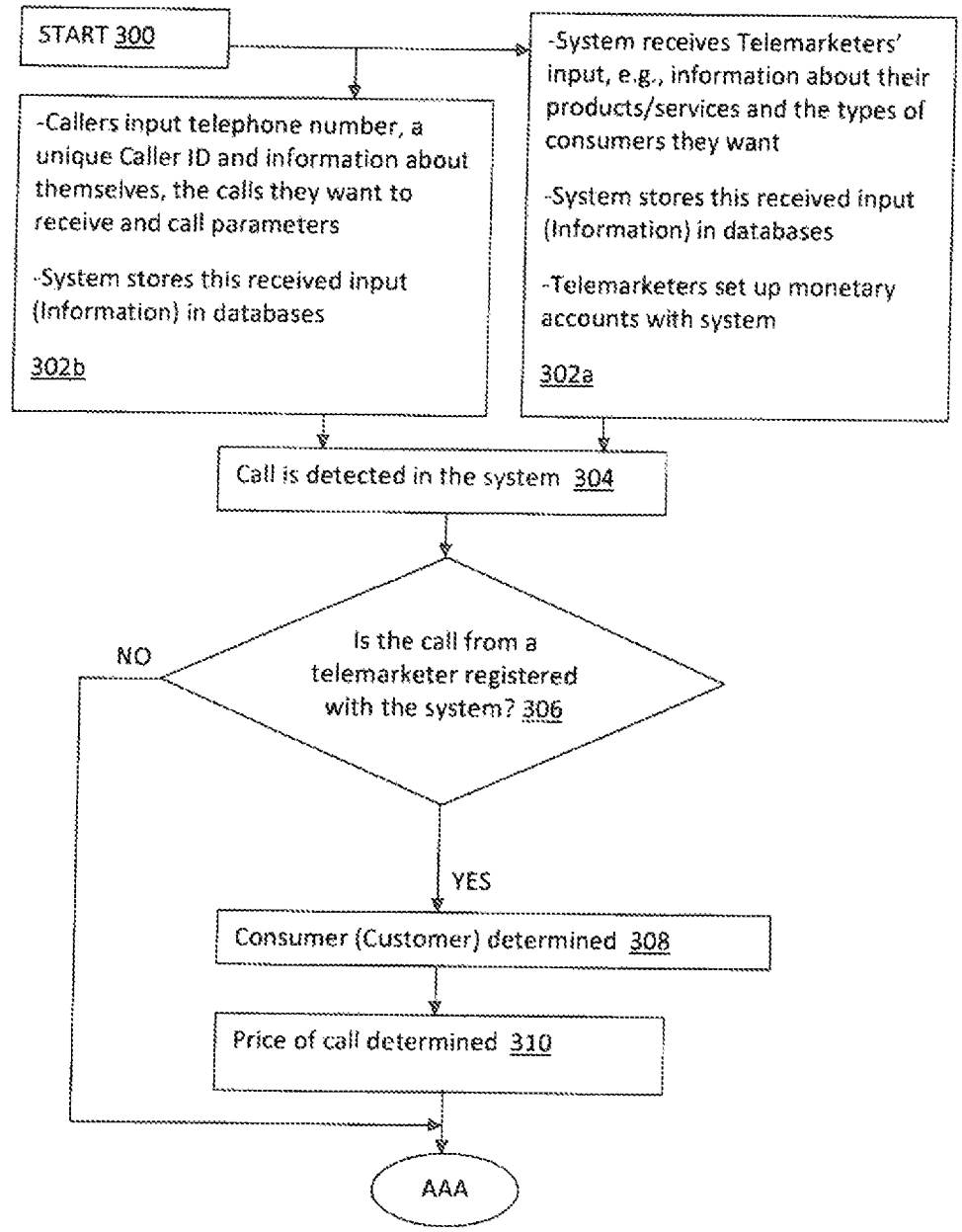
Figure 3B:
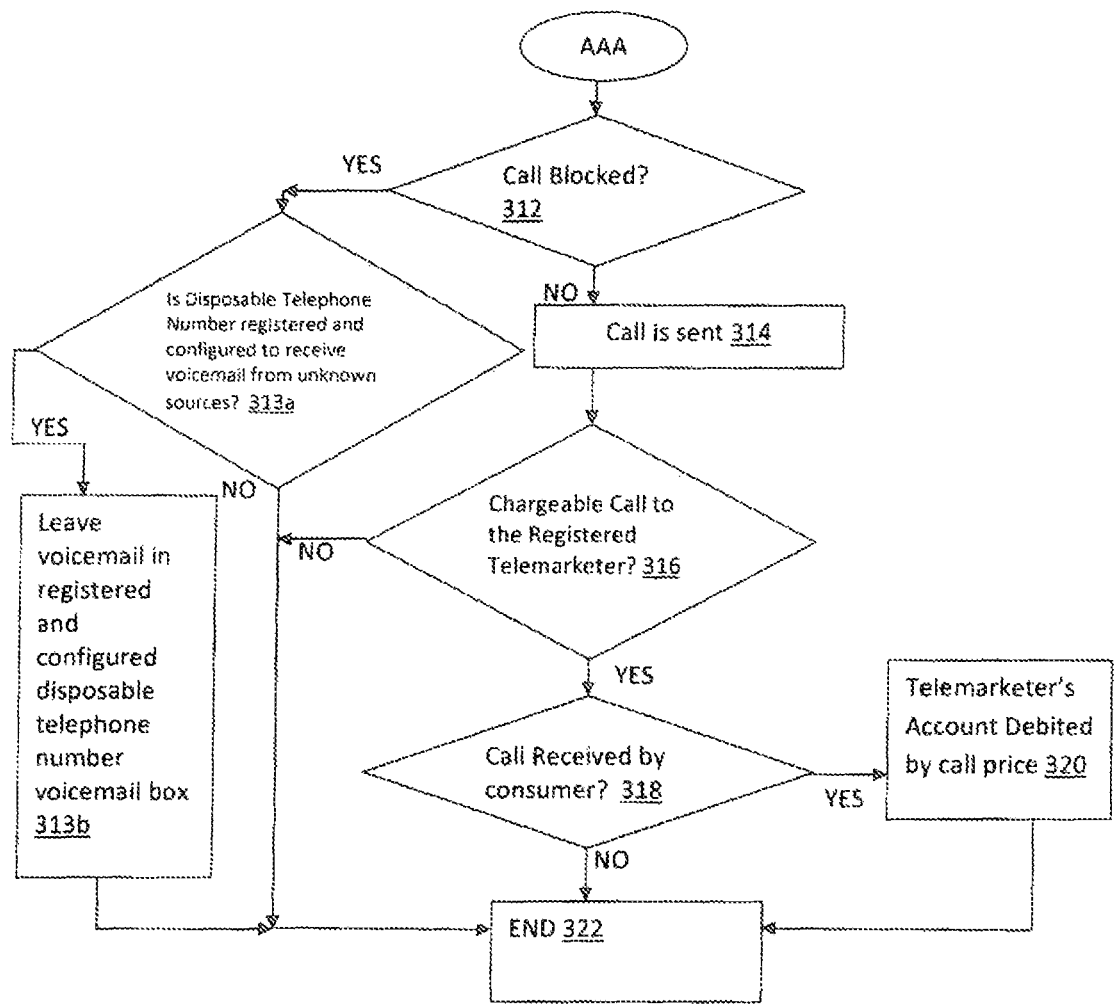

Attention is now directed to FIGS. 3A and 3B which show a flow diagram detailing computer-implemented processes in accordance with embodiments of the disclosed subject matter. Reference is also made to elements shown in FIGS. 1 and 2A-2C. The process and sub-processes of FIGS. 3A and 3B are computerized processes performed by the system 102'. The aforementioned processes and sub-processes can be, for example, performed manually, automatically, or a combination thereof, and, for example, in real time.

The process begins at the START block 300. At the START block 300, telemarketers 110a-110n at block 302a, and consumers 110a-110n, at block 302b, provide information to populate the respective databases 210, 211, which is received by the system 102' and the databases 210 (Telemarketers/Information Providers/Advertisers (TIPA)), 211 (Consumers), are populated accordingly.

At block 302a, for example, the telemarketer provides input, such as information about their products and services, the types of consumers, with whom they want to contact and speak with and other criteria. The telemarketer also sets up its monetary account with the accounting module 214 of the system 102'. All of this input data is received by the system 102' and stored in the various system 102' databases, such as database 210.

At block 302b, the consumer registers one or more phone numbers which the call module 206 shall be able to monitor, for example in order to permit calls to ring through, or to block. The system 102' also receives information from consumers, for example, consumer information such as identity information, e.g., one or more of name, email, address, telephone number, fax number, password(s), other information about the consumer, such as age, marital status, children information, interests, occupation, hobbies and the like, desired or minimum monetary amount the consumer would like to receive for each call (or various amounts depending on the information/subject of a telemarketer call), the calls, types of calls or other communications, such as text messages, they want to receive, and contact parameters, such as the day/time they want to or do not want to be contacted, the maximum number of calls or texts or other communications they wish to receive per month (or week or other relevant time period) and the like. This information is stored in the system 102' databases, such as the database 211. This information is received by system 102' either through website/portal or via the CAPP 103', or a combination thereof, depending upon a consumer's preferences, behavior and convenience.

From blocks 302a and 302b, the process moves to block 304.

At block 304, a call is detected by the call module 206, as having been input or entered into the system 102'. This call is any call which a registered consumer has allowed the system 102' to receive or intercept, for example, ranging from all calls all the time, to calls at certain days, times, and the like. The process moves to block 306, where the call is detected by the call module 206 as either from a telemarketer registered with the system 102' (known as a registered telemarketer), or another caller. Should the call not be from a registered telemarketer, the process moves to block 312.

Should the call be from a registered telemarketer, the process moves to block 308. At block 308, the consumer is determined. For example, for calls initiated (for example, over the Internet through a portal connected to interface 208, or a by calling into a central telephone number) by a telemarketer registered in database 210, the telemarketer will transmit the unique code corresponding to a specific campaign, subject or topic, which will cause call module 206 to retrieve the relevant data from database 210, such as relevant keywords or categories, demographics and/or psychographics, price it will pay a consumer for a call, etc., and the call module 206 will then scan the consumer database 211, for consumer information (data), to correlate telemarketer information (data) with consumer information (data), to select the best consumer to receive the call, hence, determine the consumer to receive the call. The price of the call may also be determined at this time, at block 310, for example, by the call module 206. The process then moves to block 312.

At block 312, the system 102' determines whether to block the call. For example, the call module 206 monitors calls placed to all telephone numbers registered in database 211. If call module 206 detects the call was initiated by a telemarketer properly registered in database 210, the process moves to block 314, where the call is sent through to the consumer. If call module 206 detects that a call has not been initiated by a telemarketer registered in database 210, the call module 206 applies its programmed rules and policies to determine whether to nevertheless permit the call to ring through, or whether to block the call. For example, the call module 206 will scan its list of known unregistered telemarketing telephone numbers and other unwanted callers. The process next moves to block 313a, where it is processed in accordance with the consumer's expressed preferences, as configured by the consumer from time to time, and recorded in database 211. If the telemarketer is on a list of unwanted callers, the process will move through block 313a and terminate by moving to block 322, where it ends. If the telemarketer or caller is not on any list of unwanted callers, and the consumer has created and configured a disposable telephone number account via module 209, to receive and record unknown messages, and if the calling number is otherwise in accordance with the system rules and policies, the process moves to block 313b to record and store a voice message, and thereafter to block 322 where the process ends. If there is a disposable telephone number account but it is configured by the consumer to permit unknown calls which are not on any block list, to ring through, then the process moves to block 314, where it is permitted to ring through to the consumer's registered phone number. If there is no disposable telephone number account and the caller is on a list of unwanted callers or the consumer has configured their preferences to reject all unknown callers, then the process moves to block 322, where the call is terminated and the process ends. Should the calling number, telemarketer or other caller not be on any list of unwanted callers, and if the calling number is otherwise in accordance with the system rules and policies, the process moves to block 314 where it can ring through to the consumer's registered phone number.

Returning back to block 312, it is determined whether the call or other communication (e.&, an unsolicited text message) is to be blocked, depending upon whether there is sufficient data to identify the caller as an unwanted caller. Registered consumers may add to lists of numbers which they want blocked from reaching them, and they may further identify the unwanted number as a telemarketer or some other category of caller. Call module 206 will maintain lists of robocallers and other unwanted callers based on publicly available information, as well as information acquired by the operation of system 102' and the data input by registered consumers, registered telemarketers and the system administrators. Call module 206 will block calls to a registered consumer from each telephone number the consumer indicated they want blocked, any specific telemarketer they want blocked, and any number identified by call module 206 as a robocaller or other unregistered telemarketer. The consumer may alternatively indicate they wish all calls or other electronic messages to be blocked except when they originate from certain permitted numbers (including those from acceptable categories of registered telemarketers). Alternately, if the consumer has selected a disposable phone number through disposable telephone number module 209, and the consumer has configured their preferences for that disposable telephone number to receive any calls not otherwise identified by call module 206, then the calling number may be forwarded to the voicemail box associated with the consumer's disposable phone number, as earlier described. The consumer may alternately configure preferences to have the calling number be forwarded to any other compatible voicemail box, including the voicemail, if any, of the consumer's phone number registered with system 102'. If call module 206 cannot identify an incoming call as a caller to be blocked, nor as a registered telemarketer, and the consumer has not selected or sufficiently configured a disposable phone number account through disposable telephone number module 209, call module 206 will permit the call to ring through. Consumers 120*a*-120*n* may update their preferences (such as but not limited to the addition, modification or deletion of disposable phone numbers), including those pertaining to unwanted callers, at any time through the application 103', which they have downloaded onto their smartphone, computer or the like, or via the online portal through which they may access their account on system 102'.

Also at block 312, the call module 206 determines, for example, in real-time, pursuant to its programmed rules and policies, e.g., whether the consumer is on one of its "Do Not Call" lists, whether the consumer registered an interest in the telemarketer' s campaign on the basis of keywords or categories checked by the consumer, whether the consumer disclosed demographics and/or psychographics compatible with those desired by the telemarketer, whether the caller is on a block list, whether the consumer is agreeable to receiving a call or other communication at the time the call was placed, and the like, and sends the call to, or permits the call to ring through to, or the text message or other communication to be transmitted through to, the germane consumer, over the network 100. With the call or other electronic communication from the telemarketer now received by the consumer, an interactive contact or interactive contact session is made between the telemarketer and the consumer. This interactive contact or interactive contact session continues until either the telemarketer or the consumer ends, or otherwise terminates the call or other electronic communication.

In setting up and making the call, including connecting the call between the telemarketer and the consumer determined to receive the call, by the call being transmitted to the consumer, or transmitting a text message or other electronic communication, as per blocks 304, 306, 308, 310, 312 and 314, the call module 206 and NCECM 215 keep consumer information anonymous and hidden from the telemarketer who is initiating the call or other communication based on choices earlier made by the consumer and recorded in database 211. If the consumer 120*a*-120*n* elects to remain anonymous, the only information about the consumer that is available to the telemarketer is in an 'anonymous' format, and may include, for example, the consumer's general geographic location, and/or a preference to only speak with a vendor or to only receive text messages from a vendor. Although the system 102' has full access to the information in database 211 and call module 206 and NCECM 215 utilize that information in deciding which consumer to connect with which telemarketer campaign, the only consumer information from database 211 shared with the telemarketer at the time the call is connected or the communication is transmitted, is the information approved for disclosure by the consumer. Neither call module 206 nor non-calling electronic communications module 215 allow for the passage of PII (personally identifiable information) about the consumer, to be made available to the telemarketer, without the consumer's affirmative consent or action (e.g., providing the information in the course of a call or a follow-up call, or making selections in their consumer platform account or via text message responses to tender certain information about themselves to registered telemarketers).

NCECM 215 helps control what information is disclosed to the advertiser by ensuring any phone number or link inserted into a text message or similar electronic communications displayed to the consumer, whether or not activatable (e.g., through a click-to-call or hyperlink implementation), is controlled by system 102', before it passes through to the advertiser (or other content provider). Thus, for example, a text message containing a click-to-call phone number for an advertiser, will not contain a phone number which directly rings the advertiser; the phone number will be a unique number controlled by system 102' and maintained in telemarketer database 210, which will forward the consumer's call to a number designated by the advertiser. Consequently, the call to the advertiser will be coming from system 102' and in this manner, the advertiser will only know that the call is coming from a consumer associated with system 102', but will not know the identity of or other information about the caller, unless system 102' provides the additional information, as permitted by the consumer and recorded in the consumer's preferences maintained at consumer database 211. For avoidance of doubt, the unique identifier associated with each advertising campaign enabling the consumer to call the advertiser may be a phone number but is not limited to a phone number. It may also be some other numeric, alphabetical or other alpha-numeric ID associated with each advertising campaign and recorded in telemarketer database 210.

A consumer may invite the telemarketer to contact the consumer for follow-up calls through call module 206 or non-calling electronic communications module 215, while remaining anonymous. The consumer and telemarketer making such arrangement will have their preferences recorded in databases 210 and 211. When the telemarketer next initiates the appropriate promotional campaign in which the consumer indicated interest, that consumer will be in the pool of eligible participants to be called or to otherwise receive an electronic communication; if an appointment for a follow-up call for a date and time certain was made, the telemarketer shall be notified in advance to remind them to initiate the call and, depending on the consumer's contact preferences, the consumer may be sent a text message in advance to confirm the appointment as well.

The system 102' then determines whether the call is a chargeable call or other communication to a registered telemarketer, at block 316. This is done for example, by verifying that the telemarketer, is a registered telemarketer, who is the entity making the call to the consumer. Should the call not be a chargeable call, for example, it is a call from an entity other than a registered telemarketer, which the system was permitted to process by the consumer, the process moves to block 322, where it ends. Alternately, should the call be chargeable, the process moves to block 318.

At block 318, the call module 206 or non-calling electronic communications module 215, as germane, determine whether the aforementioned chargeable call or text message (from a registered telemarketer) was received by the consumer. This receipt may, for example, be defined by the consumer staying on the telephone for a predetermined time, so that a bona fide discussion ensued between the telemarketer and consumer. This may also include a response by the consumer or the telemarketer, such as a voice indication, touch, swipe or other activation of a link in a text message, or a touch screen, mouse click, or button depression on a cellular phone, smart phone or regular telephone, or the like, at, within and/or after a predetermined time, or other verification of receipt of the call or other communication by the consumer or by the telemarketer via the application 103 or via the online account portal of the telemarketer or consumer, in system 102'.

Should the consumer have received the call or other message from a registered telemarketer and its receipt was verified, the process moves to block 320, where the call module sends data of the completion of the call or other communication to the accounting module, along with the electronic communication or call amount based on rules, processes and formulae, in order to debit the telemarketer's account and credit the consumer's account for this call or other communication. Rules and processes are used to dictate the amount charged for the call or other communication. For example, use of text messaging services to set and confirm appointment times, and heavy use of demographic information, may result in additional charges for a call. Use of only text messages, without phone calls, may result in reduced charges. The process then moves to block 322 where it ends.

Returning to block 318, should the call not be answered, or its receipt not verified, the process moves to block 322, where it ends.

For example, a determination of which consumer to call by a telemarketer, such as that performed at block 306, is now illustrated. Telemarketer 1 (for example represented by 110*a*), and shown in Database 210 of FIG. 2B, to which reference is also made, is marketing a new restaurant that is franchised throughout the United States. The restaurant franchise serves fast food, such as hamburgers, hot dogs, and french fries and has registered a campaign with the system 102' for a free dessert with the purchase of any entrée. Telemarketer 1 fills out a preferred demographic profile which leaves the category "healthy lifestyle" unchecked. Telemarketer 1 will pay up to $2.50 to complete a call with any registered consumer in the platform.

Consumer 1 (represented by 120*a*) registered with the system 102', as shown in the database 211 of FIG. 2C, to which reference is also made, and also checked interest categories for "food" and "restaurants", as well as disclosed a demographic affiliation with "healthy lifestyle". Consumer 2 (represented by 120*b*) registered with the Platform 102' and has checked categories of interest in promotions for "food" and "restaurants" and has not provided any demographic profile information. Consumer 3 registered with the Platform 102' and checked the interest category "travel." When Telemarketer 1 contacts call module 206 and tenders the code for its free dessert offer, call module 206 utilizes its rules and policies in real time to determine Consumer 3 is unsuitable for the campaign because no relevant interest category was checked by Consumer 3. Call module 206 next determines that on the basis of the available information between Consumer 1 and Consumer 2, Consumer 2 is the best candidate to call, because Consumer 1's disclosed demographic profile includes a check for "healthy lifestyle" while Consumer 2'*s* demographic profile left the "healthy lifestyle" category unchecked, as preferred by Telemarketer 1. Accordingly, Telemarketer 1 will have its call connected by the call module 206 to Consumer 2. The information tendered to Telemarketer 1 by system 102' is that Consumer 2 has checked only the "food" and "restaurant" categories; no personally identifiable information such as name, address or telephone number is tendered by the Platform to Telemarketer 1.

Alternatively, the system 102' is able to conduct polls or surveys, such as polls initiated by journalists, politicians, medical groups, educational groups, or private parties undertaking consumer focus group surveys. With this system, the survey taker or pollster is substituted for the role of the telemarketer.

In another alternative, the system 102' is configured to provide telecommunications services and supplementary functionality to an Internet-based marketplace generally relying upon text-based communications, in which buyers or sellers wish to interact with each other while initially remaining anonymous. For example, in a marketplace such as one operated by Ebay®, potential buyers may from time to time wish to communicate with sellers via a voice call rather than standard text-based methods, but the buyer may wish to remain anonymous unless or until they consummate a transaction with the seller. In the case of this alternative embodiment, sellers and buyers may contact and communicate with each other using the same rules disclosed above, with sellers generally substituted for the role of the telemarketer, and potential buyers generally substituted for the role of the consumer. Yet another example of this alternative configuration pertains to a dating marketplace in which participants may meet each other and, if they so choose, eventually set up meetings or dates, but initially wish to remain anonymous. System 102' may initially match participants based upon compatible interest, geographic, timing and other categories, substantially similar to the manner in which the system matches a telemarketer with a consumer, enabling participants to speak with and/or text message each other, without any exchange of personally identifiable information, unless and until such PII is affirmatively provided by one participant to the other.

A third alternative pertains to the use of the system 102' to make calls on behalf of various non-profit or advocacy groups seeking support or donations from the public. In this embodiment, members of the public may register with the system 102' to indicate causes and ideas of interest to them, much like consumers may indicate interest in specific goods or services, and advocacy or non-profit groups may create campaigns in system 102' much like an advertiser may create a campaign for its goods or services.

A fourth alternative pertains to the use of the system 102' to make calls between participants interested in any imaginable topic, ranging from religion, to sports, philosophy, education, hobbies, etc. Similar to a match-making system fostering dating, system 102' may make connections between participants sharing similar interests who wish to discuss or exchange information about any imaginable topic. Just as, for example, telemarketer is connected with a consumer interested in life insurance, a participant interested in learning about model train collecting may be connected with another hobbyist-expert in model trains.

The implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system or a cloud-based platform (such as those provided by Amazon Web Services™ or Microsoft® Azure™).

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, non-transitory storage media such as a magnetic hard-disk and/or removable media, for storing instructions and/or data. Optionally, a network connection is provided as well. A display and/or a user input device such as a keyboard or mouse are optionally provided as well.

For example, any combination of one or more non-transitory computer readable (storage) medium(s) may be utilized in accordance with the above-listed embodiments of the present invention. The non-transitory computer readable (storage) medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

As will be understood with reference to the paragraphs and the referenced drawings, provided above, various embodiments of computer-implemented methods are provided herein, some of which can be performed by various embodiments of apparatuses and systems described herein and some of which can be performed according to instructions stored in non-transitory computer-readable storage media described herein. Still, some embodiments of computer-implemented methods provided herein can be performed by other apparatuses or systems and can be performed according to instructions stored in computer-readable storage media other than that described herein, as will become apparent to those having skill in the art with reference to the embodiments described herein. Any reference to systems and computer-readable storage media with respect to the following computer-implemented methods is provided for explanatory purposes, and is not intended to limit any of such systems and any of such non-transitory computer-readable storage media with regard to embodiments of computer-implemented methods described above. Likewise, any reference to the following computer-implemented methods with respect to systems and computer-readable storage media is provided for explanatory purposes, and is not intended to limit any of such computer-implemented methods disclosed herein.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein, the singular form "a", "an" and "the" include plural references unless the context clearly dictates otherwise.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

The above-described processes including portions thereof can be performed by software, hardware and combinations thereof. These processes and portions thereof can be performed by computers, computer-type devices, workstations, cloud-based platforms, processors, micro-processors, other electronic searching tools and memory and other non-transitory storage-type devices associated therewith. The processes and portions thereof can also be embodied in programmable non-transitory storage media, for example, compact discs (CDs) or other discs including magnetic, optical, etc., readable by a machine or the like, or other computer usable storage media, including magnetic, optical, or semiconductor storage, or other source of electronic signals.

The processes (methods) and systems, including components thereof, herein have been described with exemplary reference to specific hardware and software. The processes (methods) have been described as exemplary, whereby specific steps and their order can be omitted and/or changed by persons of ordinary skill in the art to reduce these embodiments to practice without undue experimentation. The processes (methods) and systems have been described in a manner sufficient to enable persons of ordinary skill in the art to readily adapt other hardware and software as may be needed to reduce any of the embodiments to practice without undue experimentation and using conventional techniques.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The invention claimed is:

1. A method for establishing telecommunications from a computer comprising:
    receiving from a user, by a computer, a code corresponding to at least a telephone number of the user, the user being an intended recipient of for telecommunications transmitted through the computer from at Least one entity;
    the computer associating the code with the user;
    the computer, upon transmitting the telecommunications to the user, from the at least one entity, associating the code with calls the telecommunications to the user from the at least one entity, such that the at least one telephone number of the user is anonymous to the at least one entity; and,
    the computer sending the code for displaying on a communication device associated with the user, when the computer transmits the telecommunications from the at least one entity to the communication device associated with the user, wherein the communication device includes: a telephone, a smartphone, a cellular phone, a mobile device or an electronic communication device.

2. The method of claim 1, wherein the computer includes a computerized calling platform.

3. The method of claim 1, wherein the at least one entity provides information to the user in the telecommunications to the user.

4. The method of claim 1, wherein the code is selected by the user.

5. The method of claim 1, wherein the at least one entity includes one or more entities selected by the computer in response to received consumer data that consumer will receive information provided by the one or more entities, in telecommunications from the one or more entities.

* * * * *